United States Patent [19]

Cochran et al.

[11] 4,125,179

[45] Nov. 14, 1978

[54] SYNCHRONIZING DEVICE HAVING SPRING PIN THRUST MEMBERS

[75] Inventors: Phillip R. Cochran, Toledo, Ohio; Paul J. Ashburn, Petersburg, Mich.

[73] Assignee: Dana Corporation, Toledo, Ohio

[21] Appl. No.: 818,771

[22] Filed: Jul. 25, 1977

[51] Int. Cl.² .............................................. F16D 23/06
[52] U.S. Cl. ................................ 192/53 E; 192/53 A; 192/53 F
[58] Field of Search ................. 192/53 A, 53 B, 53 C, 192/53 E, 53 F

[56] References Cited

U.S. PATENT DOCUMENTS

| | | | |
|---|---|---|---|
| 2,175,857 | 10/1939 | Simpson | 192/53 |
| 2,667,955 | 2/1954 | Bixby | 192/53 A |
| 2,814,373 | 11/1957 | Bixby | 192/53 B |
| 2,957,564 | 10/1960 | Peras | 192/53 A |
| 3,078,975 | 2/1963 | Eaton | 192/53 E |
| 4,018,319 | 4/1977 | Thomas | 192/53 E |

Primary Examiner—Allan D. Herrmann
Attorney, Agent, or Firm—Robert M. Leonardi; Robert E. Pollock

[57] ABSTRACT

A synchronizing device is provided having improved thrust members supported by a pair of friction rings and releasable associated with a shiftable clutch collar. The thrust members are in the form of compressible C-shaped spring pins frictionally disposed in suitable openings in the shiftable clutch collar. The spring pins include integral ribs adapted to cooperate with suitable openings in the clutch collar to prevent the friction rings from drifting when the clutch collar is in its neutral position and also provide an operator with adequate "feel" when effecting a shift.

10 Claims, 7 Drawing Figures

SYNCHRONIZING DEVICE HAVING SPRING PIN THRUST MEMBERS

BACKGROUND OF THE INVENTION

The present invention relates in general to synchronizing devices and more particularly to an improved thrust member of establishing preliminary frictional engagement in such a device prior to positive locking engagement between a pair of tooth clutches.

Synchronizing devices of this type are well known and normally have a friction portion consisting of a pair of cone-type friction rings releasably connected to a positive coupling portion in the form of an axially shiftable clutch collar. The friction portion facilitates clash-free shifting between clutch teeth on the coupling collar and mating clutch teeth on an associated gear by initially engaging appropriate friction means on the gear to either speed up or slow down the mating elements until the speeds are approximately equal. When this occurs the friction portion is released and the clutch teeth engage. In such arrangements the fricton rings are rigidly held in axially spaced relation by a plurality of circumferentially disposed solid pins. The coupling collar, which is the positive clutch portion of the synchronizing device, is located between the friction rings and has openings through which the pins extend. Coacting blocking shoulders are normally provided on the pins and within the openings. In shifting, the initial axial motion is transmitted from the coupling collar to the friction rings by a plurality of thrust members. These thrust members carry the friction rings toward the gear to be engaged until sufficient contact is made with the mating friction surface on the selected gear. The accelerating force of the friction ring driving the selected gear results in a limited rotation of the friction rings relative to the coupling collar causing the blocking shoulders in the openings to lock with those on the pins. Continued pressure on the gear shift lever forces the friction surfaces firmly together by means of the blocking shoulders so that the friction ring and selected gear approach the same speed. When substantial synchronization occurs, the load on the blocking shoulders is relieved allowing the clutch collar to pass over the blocking shoulders on the pins to complete the shift.

Thrust members for synchronizing devices of the above type have taken many forms including flat stamped spring loaded members, the more common spring loaded plunger type and those utilizing a split-pin design consisting of a pair of semi-cylindrical halves which are biased apart within the openings by separate resilient means.

These prior designs are generally satisfactory functionally but are costly and present assembly and possible replacement problems due to the multiplicity of parts involved.

SUMMARY OF THE INVENTION

The present invention overcomes the problems with a synchronizer having a one piece thrust member. The thrust member consists of a longitudinally extending C-shaped spring pin having integral means such as stamped longitudinal ribs for cooperating with suitable openings provided in the shiftable coupling member. The spring pin is used in a generally conventional synchronizer simplifying its construction with no sacrifice in performance.

Other objects and advantages will become apparent from the following description of the invention with reference to the accompanying drawings.

DESCRIPTION OF THE PREFERRED EMBODIMENT

Figure 1:
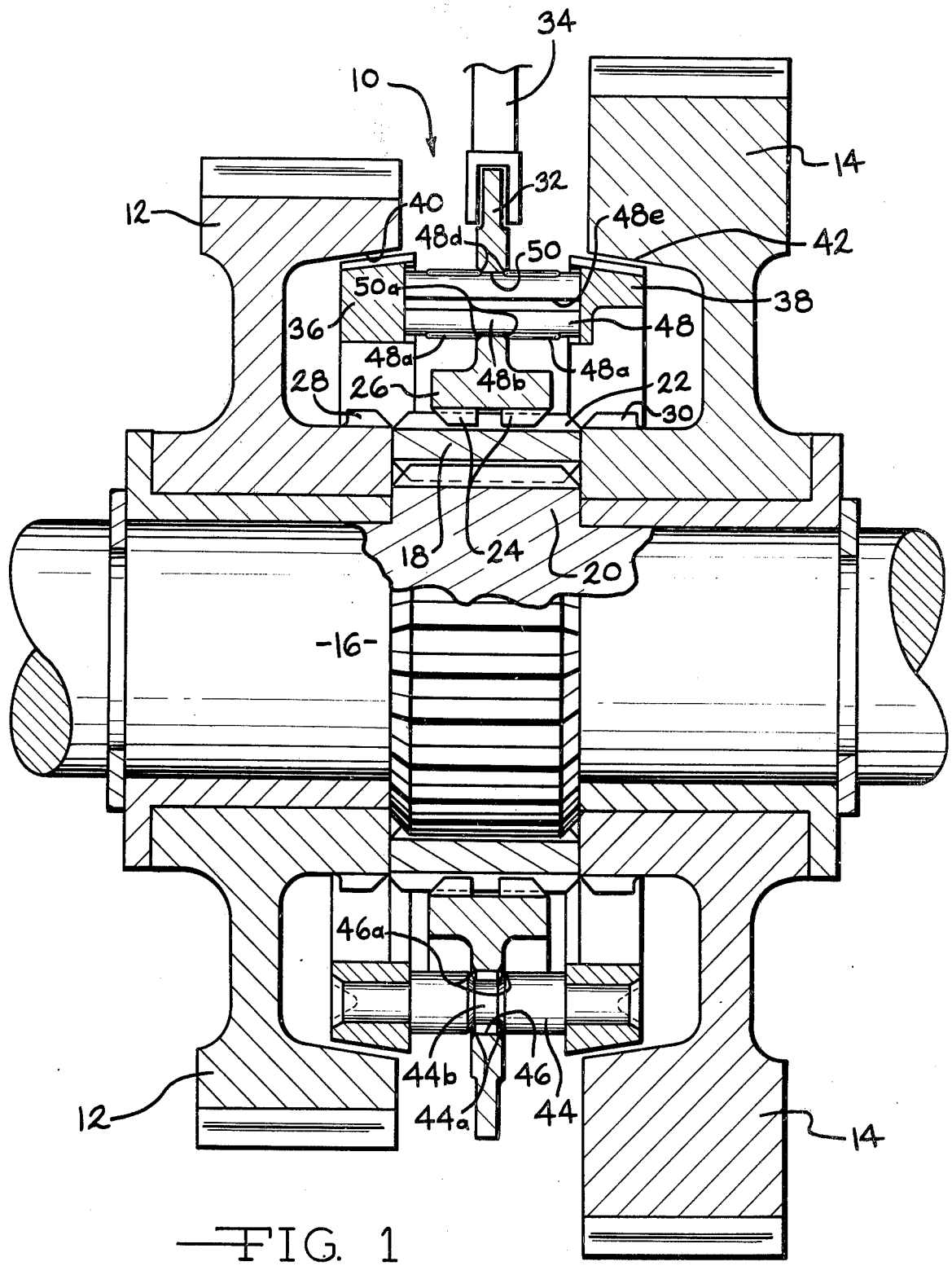
FIG. 1 is a longitudinal sectional view of a preferred embodiment of the synchronizing device of the present invention shown with the associated transmission gearing and corresponding to a section taken along line 1—1 of FIG. 2.
Figure 2:
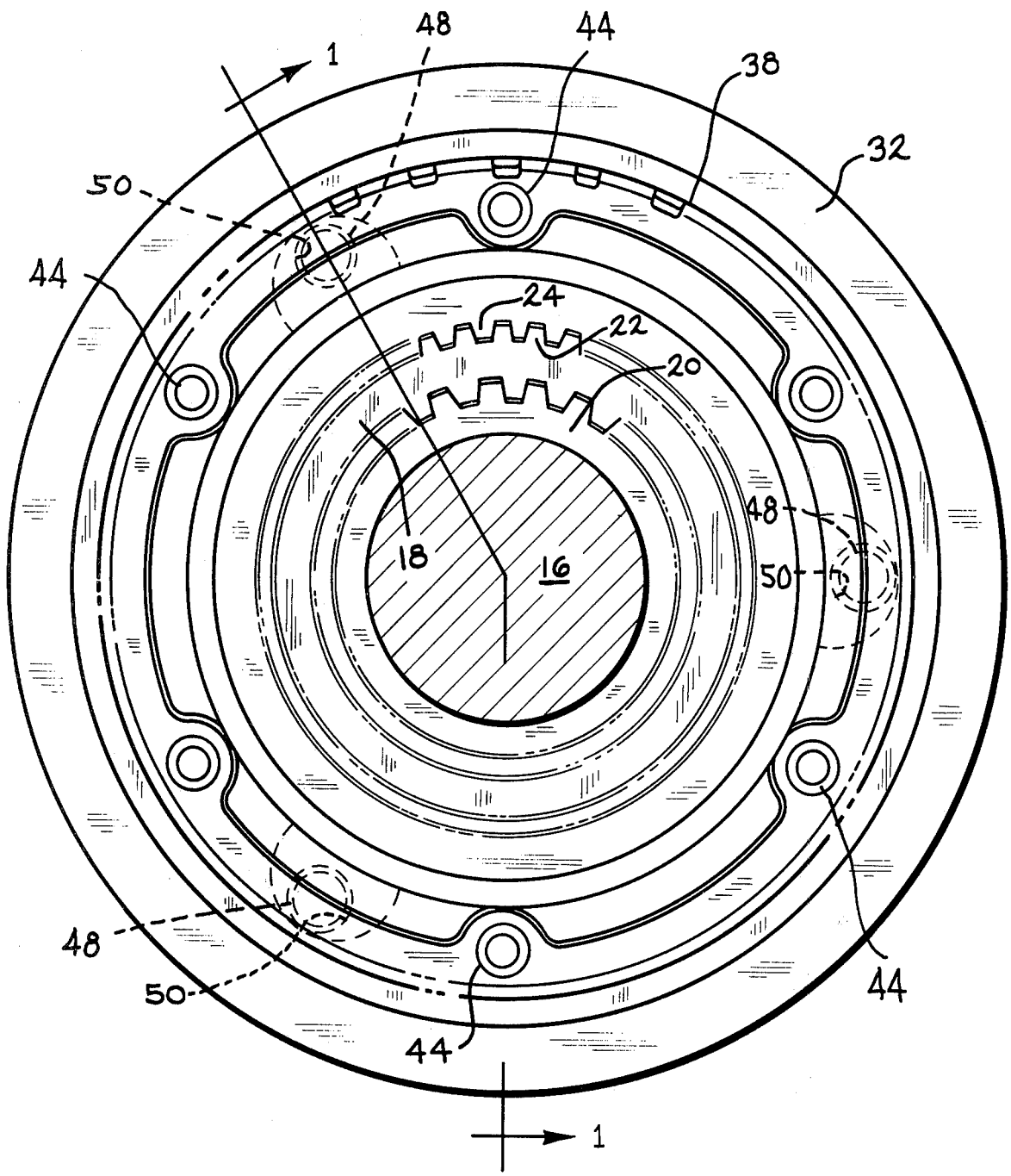
FIG. 2 is an end view of the synchronizing device shown in FIG. 1 with the transmission gearing omitted.

Referring now to the drawings and particularly FIGS. 1 and 2, a synchronizing device 10 having friction and positive clutch portions is shown located between a pair of axially spaced gears 12 and 14 of a change speed gear unit. Each gear is provided with friction and positive clutch means for mating with the friction and positive clutch portions of the synchronizing device. Gears 12 and 14 are rotatably mounted on a shaft 16 and axially held relative thereto by any suitable means. A carrier sleeve 18 is axially fixed between gears 12 and 14 and splined to an enlarged diameter portion 20 of shaft 16 so as to be rotatable therewith. The sleeve 18 has external longitudinal splines 22 on which internal splines 24 of a coupling collar 26 are guided for relative axial sliding movement.

Internal splines 24 of the coupling collar 26 constitute the positive clutch portion of the synchronizing device 10 and are adapted to selectively cooperate with adjacent external clutch teeth 28 and 30 on the inner ends of gears 12 and 14 respectively. The external clutch teeth 28 and 30 make up the positive clutch means of the gears and correspond in shape to external splines 22 on sleeve 18 so that upon shifting of coupling collar 26 in opposite directions they will mesh with internal splines 24 thereon.

Shifting of coupling collar 26 axially to the left, from the neutral position shown, will selectively engage internal splines 24 with clutch teeth 28 to effect a driving connection between shaft 16 and gear 12 through sleeve 18. Shifting of coupling collar 26 to the right from neutral will effect selective engagement between internal splines 24 and clutch teeth 30 to drivingly connecting gear 14 to shaft 16 through the sleeve 18.

To effect axial shifting of the coupling collar 26 in opposite directions from its neutral position, an annular radially extending flange 32 is constructed as an integral part of the coupling collar 26 for cooperative engagement with a shift fork 34. Operation of shift fork 34 is accomplished in a conventional manner by an operator controlled shift lever (not shown).

The friction portion of the synchronizer unit 10 is designed to facilitate a clash-free shift between the mating positive clutch elements which include the internal splines 24 of axially shiftable coupling collar 26 and clutch teeth 28 and 30 of gears 12 and 14 respectively. To this end, the friction portion of the synchronizing device 10 is adapted to cooperate with mating friction means provided on the respective gears to establish a preliminary frictional engagement between the selected members prior to positive locking engagement of the tooth clutches. The friction portion of the synchronizer unit 10 includes a pair of cone-type friction rings 36 and 38 while the friction means on the gears 12 and 14 consist of cooperating similarly shaped opposed friction elements 40 and 42, respectively.

More specifically, friction rings 36 and 38 are rigidly connected in axially spaced relation by a plurality of longitudinally extending solid pins 44 adapted to pass through a first set of circumferentially spaced openings 46 provided in the coupling collar flange 32. The opposite outer ends of the pins 44 are secured in the respective friction rings in a well known manner. The length of the pins 44 is such as to normally space the mating friction surfaces of the rings 36 and 38 and friction elements 40 and 42 from contact when the coupling collar 26 is in its neutral position as seen in FIG. 1.

So that synchronization can occur prior to positive locking engagement between the clutch teeth, coacting blocking means are formed in the first set of openings 46 and on connecting pins 44. The coacting blocking means cooperate in a well known manner to block axial movement of the coupling collar 26 relative to the friction rings 36 and 38 when they are rotating at different speeds. For this purpose, the outer edges of opening 46 are countersunk to provide spaced outer internal blocking shoulders 46a. Cooperating similarly tapered blocking shoulders 44a are constructed on the pins 44 by means of the centrally located reduced diameter annular groove 44b.

The operation of the blocking shoulders will be covered in more detail later.

It is essential in synchronizing devices of this type to connect the friction rings 36 and 38 for temporary initial axial movement with the shiftable coupling collar 26 and permit subsequent relative movement therebetween. The initial movement is necessary to bring the mating friction surfaces into preliminary engagement so that synchronization between the selected parts can be achieved. The subsequent movement enables the positive clutching operation to take place.

To accomplish the temporary connection, synchronizer unit 10 is provided with a plurality of thrust members to transmit initial pressure from the coupling collar 26 to the friction rings 36 and 38. In this instance the thrust members include a plurality of circumferentially spaced longitudinally extending split spring pins 48, three being shown, adapted to pass through and cooperate with a second set of circumferentially spaced openings 50 formed in the coupling collar flange 32.

Figure 6:
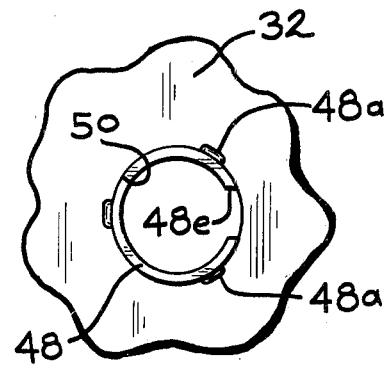
FIG. 6 is a end view of the spring pin mounted in the flange opening and showing the same in its normally expanded condition.

Each spring pin 48 is constructed in such a manner as to have spring tendencies built into it to enable a breakaway resilient connection to be established between the coupling collar 26 and the friction rings 36 and 38. The effectiveness of the synchronization of the driving and driven elements depends upon the spring strength built into the pin 48. As best seen in FIG. 6, this is accomplished by making the pin 48 C-shaped in cross-section with the spring tendency resulting by having the outer diameter of the pin 48, in its free state, slightly greater than the diameter of the opening 50 in the coupling collar flange 32. Thus, when the pin 48 is suitably positioned within opening 50, it will be compressed to a sufficient degree to establish an outward frictional force with respect to the inner surface of the opening 50 allowing the friction rings to temporarily move with the coupling collar 26.

To obtain an adequate "feel" on the shift fork 34 to let the operator know when to apply additional force to move the coupling collar 26 to effect positive clutch engagement, each pin 48 is provided with a series of circumferentially spaced longitudinally extending raised ribs 48a which are axially spaced apart by a central annular groove or intermediate annular guide portion 48b. The annular groove 48b is designed to cooperate with the opening 50 in the coupling flange 32 when the latter is in its neutral position. In the preferred embodiment, the ribs 48a are constructed of a constant height for full length with a series of ribs being located on opposite sides of the openings 50. If necessary, longitudinally extending cutouts 48c may be provided in pin 48 to obtain the desired spring tendencies.

With reference to FIG. 1, it will be seen that the outer edges of opening 50 are chamfered slightly to provide spaced outer cam shoulders 50a. The raised indentations 48a are also spaced apart by the annular groove 48b a distance substantially equal to that of the opening 50 to permit inner edges 48d thereon to butt outer cam shoulders 50a. This arrangement serves to hold friction rings 36 and 38 in a confined or axially fixed position with respect to the coupling collar 26 when it is in its neutral position and prevents friction rings 36 and 38 from drifting or floating in either direction towards gears 12 and 14 until the synchronizer unit 10 is shifted. It will be apparent that the raised indentations 48a, when the shift occurs, will give the control lever a "snap-feel" going into or shifting out of a gear range due to the compressive and expansive nature of the spring pins 48.

Thus, it can be seen that the expansive force of the spring pin 48 with respect to the opening 50 and the butting engagement of edges 48d and cam shoulders 50a are sufficient to allow the initial motion of shift fork 34 to be transmitted from this shiftable coupling collar 32 to a selected one of the friction cones 36 or 38 to carry the same toward and into contact with the mating friction element 40 or 42 on the selected gear 12 or 14. As additional force is applied to the shift fork 34, the friction surfaces are forced into tighter engagement to cause synchronization between the gears 12 and 14 and shaft 16.

Figure 7:
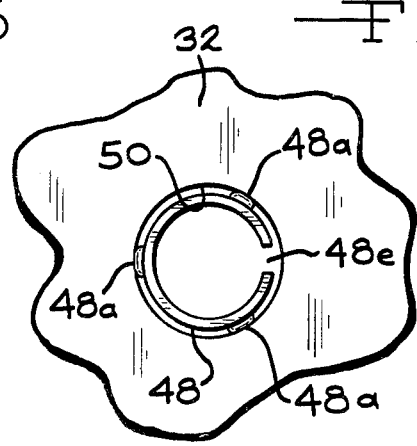
FIG. 7 is a view similar to FIG. 6 with the spring pin shown in its compressed position.

Subsequent relative movement between the coupling collar 26 and friction rings 36 and 38 results when synchronization is achieved between the selected gear and the coupling collar 26. As this occurs, the cam shoulders 50a on the coupling collar 26 ride up inner edges 48d causing radial inward compression of pins 48 to a position as shown in FIG. 7. Subsequent movement of the coupling collar 26 allows the same to slide relative to pins 48 to permit clutch teeth 24 to move into engagement with clutch teeth 28 or 30 of the selected gear 12 or 14 thereby producing a positive clutching engagement and a drive connection between the selected gear and shaft 16.

Figure 3:
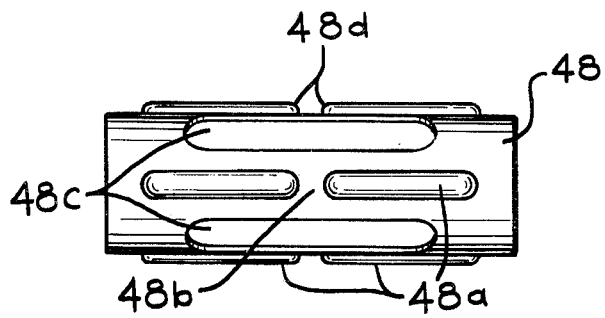
FIG. 3 is an enlarged longitudinal view of the spring pin of the present invention.
Figure 4:
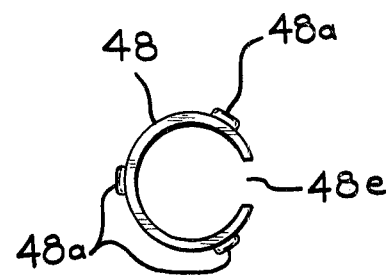
FIG. 4 is an end view of the spring pin looking from the right of FIG. 3.
Figure 5:
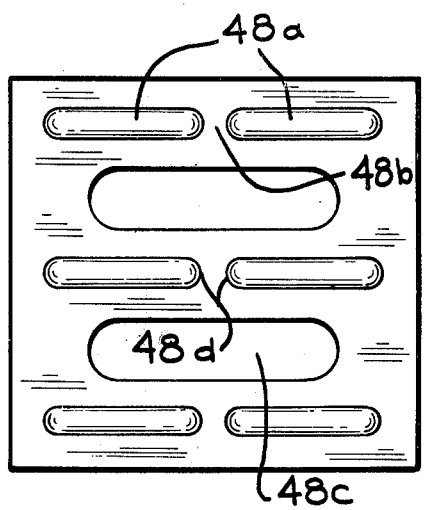
FIG. 5 is a rolled-out plan view of the spring pin blank as viewed from the outside of FIG. 3.

Referring to FIGS. 3–5, it will be seen that the split spring pin 48 is preferably constructed from a flat substantially rectangular shaped piece of spring steel, as shown in FIG. 5, and rolled into a C-shaped configuration, best seen in FIG. 4, with the ends spaced apart to provide a longitudinal slit 48e.

Prior to the rolling operation, the indentations 48a are stamped in the flat piece and, if required, the elongated openings 48c are punched therethrough.

From the foregoing, it will be seen that indentations 48a are constructed as an integral part of the spring pin 48 and arranged in such a manner as to be sufficient to yieldably block initial right and left movement of the coupling collar 26 while permitting subsequent relative movement therebetween. Further, the indentations 48a are spaced equidistantly around the periphery of the spring pin 48 to provide a balanced compressive force as the pin passes through the interior of the opening 50.

OPERATION

Referring to FIG. 1, the coupling collar 26 is shown in its center or neutral position and both gears 12 and 14 are disengaged from connection with shaft 16. The friction portion of the synchronizer unit 10, defined by the pair of friction cone rings 36 and 38, rigid connecting pins 44 and split spring pins 48, has the friction rings 36 and 38 thereon normally spaced from friction elements 40 and 42 on gears 12 and 14 respectively.

In this neutralized condition, the connecting pins 44 are centrally located within the first set of openings 46 in the coupling flange 32 with the coacting blocking shoulders 44a and 46a normally maintained out of contact. The split spring pins 48 are positioned so as to have the annular groove 48b received in the second set of openings 50 in the coupling flange 32 with the outer cam shoulders 50a thereof resting against the inner edges 48d of raised indentations 48a.

When it is desired to shift the synchronizing device 10 to couple gear 12 to shaft 16 through the externally splined sleeve carrier 18, the coupling collar 26 is axially shifted to the left in a conventional manner by the shift fork 34. As the initial movement of the shift fork 34 takes place and is translated to the coupling collar 26, the split spring pins 48 become effective, due to contact of the opening cam shoulders 50a and inner edges 48d of raised indentations 48a, to carry the friction cone ring 36 toward and into initial contact with friction element 40 on gear 12. This engagement, and the differential in speeds of the members, results in circumferential displacement of the coupling collar 26 relative to the friction ring 36 and thereby flange 32 so that connecting pins 44 move out of concentric relationship with respect to openings 46 and blocking surfaces 44a and 46a become effective to prevent further axial movement of the coupling collar 26 to the left. Thus, internal clutch teeth 24 on the coupling collar 26 cannot be coupled with mating external clutch teeth 28 of gear 12 until synchronization between the coupling collar 26 and gear 12 is achieved.

When synchronism occurs, the relative torque differential between the friction ring 36 of the synchronizer unit 10 and the coupling collar 26 diminishes and the connecting pins 44 are moved back into concentric relation with openings 46. Thus, coupling collar 26 can be shifted further to the left to effect compression of the split pins 48 by openings 50 as shown in FIG. 7, so that the internal teeth 24 of coupling collar 26 can now be moved into driving engagement with external clutch teeth 28 on gear 12.

After coupling collar 26 has completely moved to its leftmost position, the split pins 48 are still fully compressed within openings 50. This will aid in preventing any inadvertent declutching of the teeth 24 of the coupling collar 26 from the teeth 28 on gear 12.

In order to declutch the coupling collar 26 from engagement with gear 12, a reverse procedure is followed, namely, the shift lever 34 is moved to axially shift the coupling collar 26 to the right. As the collar 26 moves in this direction and the openings 50 slide relative to split spring pins 48, as the openings 50 reach and align with the annular groove 48b, the split pins 48 "snap" open to assume their normal position as shown in FIG. 6.

From the foregoing it will be seen that the present invention provides an improved thrust member for use in a synchronizer which is in the form of a single spring pin element. Further, it will be evident that other forms of indentations may be provided on the split spring pins to achieve the desired result. For example, the indentations could take the shaped or raised dimples or may be tear-drop in shape and still accomplish the desired result.

Accordingly, while a single embodiment has been shown, it will be evident that variations may be made without departing from the spirit and scope of the invention as defined in the following claims.

What is claimed is:

1. A synchronizing device, comprising:
   a shiftable coupling collar;
   a first and second set of openings in said coupling collar;
   a pair of friction rings located on opposite sides of said coupling collar;
   a connecting pin disposed in said first set of openings having outer ends secured to said pair of friction rings;
   co-acting blocking means on said connecting pins and in said first set of openings;
   C-shaped spring pins disposed in said second set of openings having outer ends in butting engagement with said pair of friction rings;
   ribs integral with said spring pins and spaced on opposite sides of said second set of openings defining an annular guide portion therebetween frictionally contacting said second set of openings.

2. A synchronizer according to claim 1 wherein said ribs are longitudinally extending and of constant height.

3. A synchronizer according to claim 2 wherein said longitudinal ribs are equally spaced about said spring pins and cutouts are provided between said ribs.

4. A synchronizer according to claim 1 wherein said second set of openings have opposed outer cam shoulders and said ribs have inner cam edges normally engageable with said opposed outer cam shoulders when said coupling collar is in a neutral position.

5. In a synchronizer device adapted to drivingly connect a selected one of a pair of gears to a supporting shaft, each gear having positive and friction clutch elements carried thereby, the synchronizer device comprising:
   a rotatable coupling collar located between the pair of gears drivingly connected to the supporting shaft and axially movable relative thereto;
   positive clutch teeth on said coupling collar selectively engageable with the positive clutch elements on the pair of gears;
   a pair of rotatable friction rings selectively engageable with the friction elements on the pair of gears;
   a first and second set of openings in said coupling collar;

a plurality of connecting pins extending through said first set of openings and having outer ends secured to said pair of friction rings;

coacting blocking means on said connecting pins and in said first set of openings engageable to prevent axial movement of said coupling collar relative to said pair of friction rings when they are rotating at different speeds;

a plurality of split compressable spring pins extending through said second set of openings having opposite ends in butting engagement with said pair of friction rings;

an intermediate guide portion on said split pins frictionally contacting said second set of openings to support said friction rings with respect to said coupling collar and normally maintain said friction rings out of engagement with the friction elements on the gears;

integral ribs on said split pins on opposite sides of said second set of openings initially engageable by said second set of openings to move said friction rings with said coupling collar to effect frictional engagement between said friction rings and the friction clutch elements on the gears and subsequently compress said split pins to permit said coupling collar to move relative to said friction rings and permit said positive clutch teeth to engage the positive clutch element on the gears.

6. A synchronizer according to claim 5 wherein said split compressible spring pins are C-shaped in cross-section.

7. A synchronizer according to claim 5 wherein split spring pins are longitudinally extending annular members, said ribs include a series of spaced longitudinal projection of constant height.

8. A synchronizer according to claim 7 wherein cutouts are provided in said split spring pins for controlling compression thereof.

9. A synchronizer according to claim 5 wherein said coupling collar has a radial flange and said first and second set of openings are located in said radial flange.

10. A synchronizer according to claim 9 wherein said radial flange has a width substantially equal to said intermediate guide portion on said split pins.

* * * * *